May 7, 1968     H. F. LIVERS     3,381,775
STAIR TREAD STRUCTURE

Filed Jan. 3, 1967     2 Sheets-Sheet 1

INVENTOR.
HAROLD F. LIVERS
BY
Fishburn and Gold
ATTORNEYS

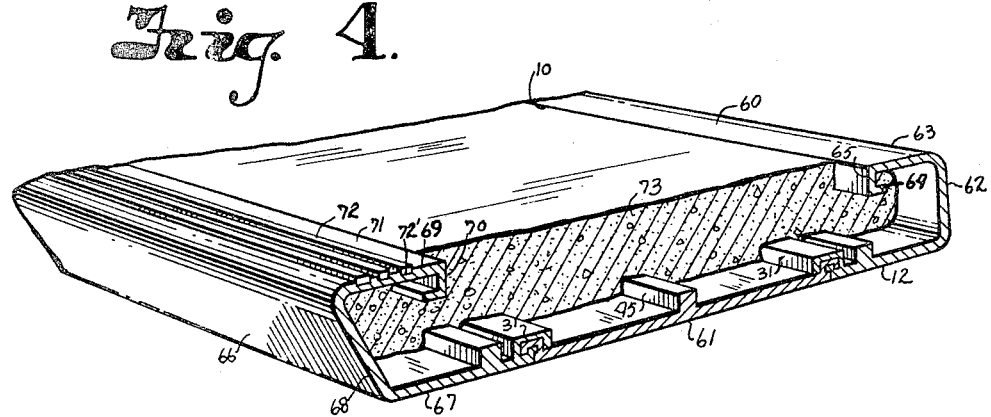

United States Patent Office 3,381,775
Patented May 7, 1968

3,381,775
STAIR TREAD STRUCTURE
Harold F. Livers, Kansas City, Mo., assignor to Livers Bronze Company, Kansas City, Mo., a corporation of Missouri
Filed Jan. 3, 1967, Ser. No. 606,848
10 Claims. (Cl. 182—228)

ABSTRACT OF THE DISCLOSURE

The stair structure having stair tread composed of elongate metal members adapted for production by extrusion and joined together in an open top pan with a tread member in said open top. The stair tread including a forward or front portion that forms a portion of the pan and also the stair tread nosing with an anti-slip surface thereon. The stair tread pan having closed ends formed by a center part having suitable extensions to adapt to the tread depth, said center portion having a sleeve mounted therein and supporting a baluster.

---

It has been common practice to build stairs with stringers, side channels, or other supports and mount tread members therebetween, said tread members being hollow open top pans filled with concrete or like material. Stair nosings for the steps have beean separate pieces secured to the pan to provide a decorative and finished appearance as well as protection to the forward portion of the respective step. Such structures are heavy, difficult to handle, and expensive to ship so the parts are usually assembled at the job site.

The principal objects of the present invention are to provide a stair tread structure capable of being fabricated at the factory thus reducing installation time and labor; to provide a stair tread structure with metal portions adapted for manufacture by an extrusion process which when assembled has suitable stiffness and strength with ligthness of weight; to provide such a stair tread suitable for use between side members or in an open stair structure with the tread members carried on stringers; to provide an open stair tread member with end closures including handrail post supports; to provide a stair tread and baluster structure that is versatile in use for different depths and widths; to provide a stair tread structure that is attractive in appearance and to provide a stair tread structure that is economical to manufacture and easily erected in a sturdy durable structure with integral non-slip step nosings.

Other objects and advantages of this invention will become apparent from the following description taken in connection with the accompanying drawings wherein are set forth by way of illustration and example certain embodiments of this invention.

FIG. 4 is a partial perspective view of a modified form of the stair tread structure having wearing surface material therein.

FIG. 5 is a partial perspective view of another modified form of a stair tread structure with a tread pan having wearing surface material therein.

FIG. 6 is a transverse sectional view of another modified form of a stair tread structure having replaceable anti-slip inserts and welded center bottom plate.

Figure 1:
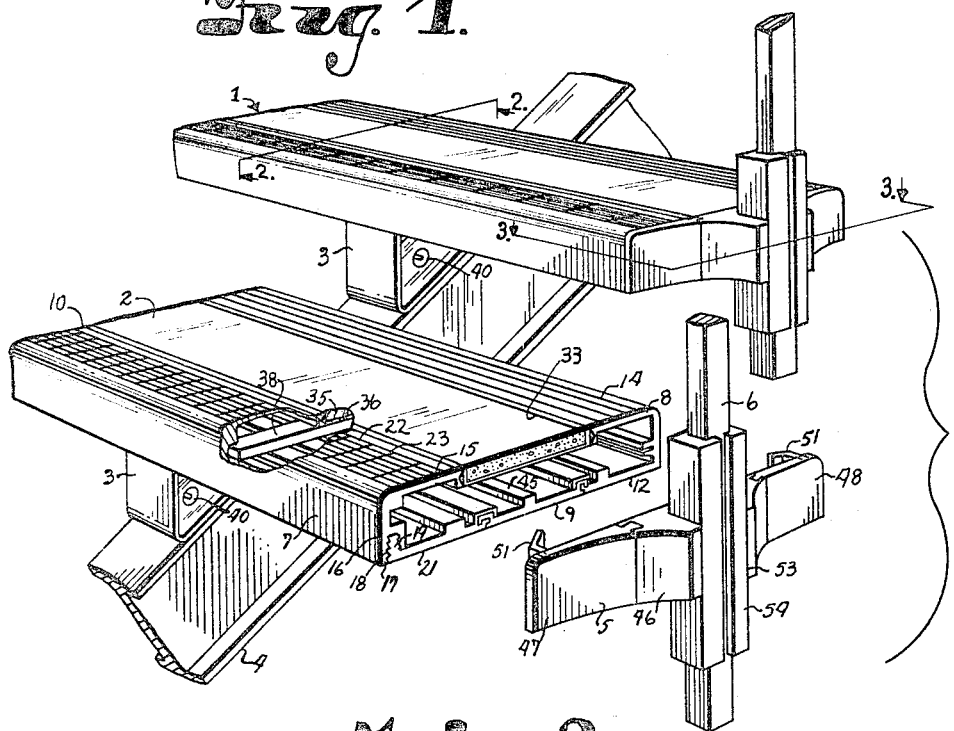
FIG. 1 is a partial perspective view of a stair, showing treads with a supporting stringer, supporting brackets and handrail posts supports connected to the tread, with portions broken away to show the tread pan support bar.

Referring more in detail to the drawings.

Reference numeral 1 generally designates a stair having a stair tread structure 2 adapted to be mounted on suitable supports to form an open or closed stair structure. The illustrated stair is open and has the stair tread structure 2 supported on brackets 3 mounted on stringers 4.

The stair tread structure 2 in the open type stair has a tread end closure structure 5 which carries a baluster or post 6 adapted to support a handrail (not shown). While only one side of the stair is shown in FIG. 1 it is exemplary only and the other side may be of the same structure and arrangement or varied to adapt to the particular installation.

In the structure illustrated the stair tread structure 2 includes metal members of uniform cross-section of suitable material such as aluminum, bronze, or brass, said materials being particularly adapted for economical manufacture as by extrusion.

The tread structure 2 includes a front and nosing member 7, a rear member 8 and a bottom assembly 9, connected and secured thereto to space said front and rear members and form an open top pan assembly 10. Each of the front, rear and bottom members extend for substantially the full width of the step.

Figure 2:
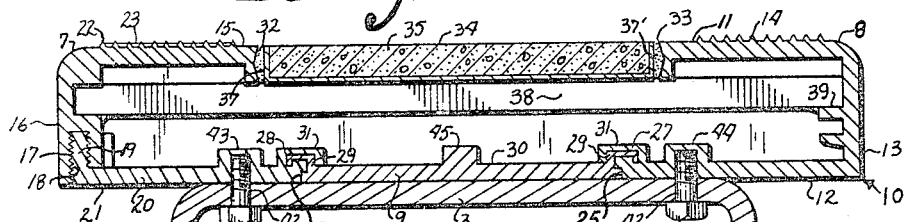
FIG. 2 is a transverse sectional view of the stair tread structure taken on line 2—2, FIG. 1.
Figure 3:
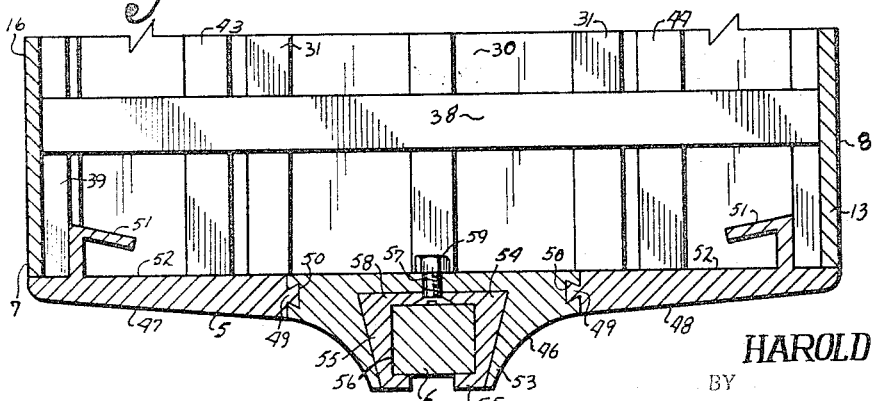
FIG. 3 is a horizontal sectional view through the stair tread structure taken on line 3—3, FIG. 2.

In the structure illustrated in FIGS. 1 to 3 inclusive the rear member 8 is generally C or channel shaped with a top portion 11 and a bottom portion 12 connected by a generally upright rear wall 13 in an integral shape with said top and bottom portions 11 and 12 being generally parallel. The upper outer surface of the top portion 11 may be provided with spaced longitudinally extending ridges 14 to resist slipping as well as to enhance appearance.

The front and nosing member 7 has a top wall 15 integral with a front upstanding wall 16 which in the illustrated structure has a longitudinally extending bottom opening channel or groove 17, with side ridges 18 on the inside face of each wall to receive a ridged flange 19 on a bottom portion 20 in securing same together so the wall 21 of the bottom portion 20 is substantially parallel to the top wall 15 of the front and nosing member 7. In the illustrated structure the upper outer surface of the top wall 15 is provided with spaced longitudinally extending ridges 22 and longitudinally spaced transverse ridges 23 to resist slipping as well as to enhance appearance.

When assembled the front and nosing member 7 and the bottom portion 20 cooperate in defining a generally C or channel shaped structure that is arranged in the stair tread structure 2 in opposed relation to the rear member 8. The adjacent longitudinal edges 25 and 26 of the bottom portion 12 and the wall 21 respectively have longitudinally continuous grooves 27 and 28 adapted to receive L shaped flanges 29 of a center bottom strip 30 to interlock therewith. The bottom portion 12 and the wall 21 have L shaped flanges 31 to inter-lock with the flanges 29 of center bottom strip 30. The depth of the steps or treads may be varied by varying the width of the center bottom strip 30 which will also vary the spacing of the adjacent or inner edges 32 of the top wall 15 and top portion 11 which defines the top opening 33 in the stair tread structure 2.

The top tread surface is completed by a tread member 34 which may be a plate or other member having a wearing surface. In the structure illustrated terrazzo, concrete, epoxy aggregate or other suitable filler 35 is formed in a shallow pan 36 formed of metal to support and add strength to the stair tread structure 2. The tread member 34 is of a width whereby opposed edges 37 are close to the edges 32 and are suitably secured thereto by epoxy or other suitable adhesive as at 37. The tread member 34 is further supported by resting on chairs or bars 38 arranged transversely of the stair tread structure 2. The bars 38 are shown with end portions resting on shoulders or ledges 39 on the inside of the front and nosing member 7 and rear member 8. The bars 38 are preferably fixed in location as by welding to said ledges 39.

In the closed stair structure the stair tread structure 2 is supported by walls or between stringers. In the open type stair the tread structure 2 is supported on brackets 3 mounted on stringers 4. The bracket 3 is suitably connected to the stringers 4 as by screws 40 or by welding. The stair tread structure 2 is connected to the bracket 3 by suitable fasteners such as bolts 41. The bolts 41 extend through openings 42 in the bracket 3 and screw into longitudinally continuous upstanding ribs 43 and 44 in the wall 21 of the bottom portion 20 and in the bottom portion 12 of the rear member 8 respectively. The bottom portion 30 preferably has a longitudinally continuous upstanding rib 45 centrally thereof for strength and stiffness.

In the open type stair the stair tread structure 2 cantilevers outside stringer 4. The exposed ends of the stair tread structure 2 are closed by tread end closure structure 5. The tread end closure structure 5 consists of a center spacer member 46 and front and rear extensions 47 and 48 respectively. The front and rear extensions 47 and 48 are suitably connected to the center spacer member 46 as by dovetail connections each connection being by a rib 49 and groove 50 in adjacent edge portions. The end closures are positioned and secured to the pan portion by members 51 which are shown as vertical ribs integral with and extending from the inner face 52 of each of the front and rear extensions 47 and 48. The members 51 are L shaped and engage inner surfaces on the front and rear members 7 and 8 of the stair tread structure 2. The members 51 engage the inside faces of wall 16 of the front and nosing member 7 and the wall 13 of the rear member, the vertical rib 51 on the front extension 47 being of a height to engage the lower inner surface of top wall 15 and the upper inner surface of wall 21. The rib 51 of the rear extension 48 is of a height to engage the lower inner surface of top portion 11 and the upper inner surface of bottom portion 12 of rear member 8. When assembled the end closures are fixed as by tack welding the front and rear tread members 7 and 8.

The center spacer member 46 has an opening 53 extending vertically therethrough with an inner shape complementary to the outside configurations of sleeve member 54 mounted therein.

In the illustrated structure the sleeve member 54 is an open channel shaped member with the outside exposed face having flanges 55 in registry with the outside exposed face of the center member 46. The sleeve member 54 has an interior opening 56 complementary to the exterior configurations of the baluster or post 6.

The sleeve member 54 is connected to the center spacer member 46 by one or more flat head screws 57 in countersunk holes 58 in the sleeve member 54 and nuts 59. The baluster or post 6 is suitably connected to the sleeve member 54 as by welding to flanges 55 or at the top and bottom of sleeve member 54.

In using a structure such as illustrated in FIGS. 1 to 3, inclusive, the metal portions are prepared by extrusions and are cut to the desired length to form the stair tread of the proper width for the stairs. The front and nosing member 7 is arranged whereby the bottom portion 20 has the flange 19 registering with the groove 17. They are then pressed together whereby the flange enters the groove to define the forward assembly. The bottom strip 30 of desired width is then arranged whereby the flanges 29 and 31 are in position wherein they can be slid longitudinally of the other to effect the assembly of the bottom strip with the front and rear assemblies however, it is preferred that in the extruding of the member 21 and the rear member 8 have the flanges 31 angled upwardly to permit the flanges 29 to enter thereunder then the flanges 31 be bent downwardly to the position shown in FIG. 2. This will permit assembly without the longitudinal sliding movement of the respective parts. The portions are tack welded at intervals to secure them in fixed relation. Terrazzo or the like material for the tread portion 34 is formed in the pan 36 and allowed to set and the upper surface properly smoothed. Before mounting the tread member in the tread it is preferred that the end assemblies be completed and moved to close the ends with the members 51 extending inside and engagement with the inner surfaces of the front and rear members 7 and 8. They are preferably permanently secured by tack welding. The plurality of bars 38 are then slid or moved into the hollow assembly of the metal parts and arranged with the ends thereof resting on the ledges 39 said bars being spaced longitudinally of the tread. The bars are then fixed into position by tack welding. The tread member 34 is arranged in the opening 33 between the edges 32 and supported on the bars 38. Suitably epoxy or the like is then arranged in the space between the outer edges of the pan 36 and the edges 32 to adhere the tread member 34 to the front and rear tread members 7 and 8. The completed stair tread can then be shipped to the building site and attached by suitable brackets 3 to stringers or other stair support members.

FIG. 4 illustrates a modified form of an open top pan assembly 60. In the illustrated modified form the center bottom strip 61 is substantially the same as center bottom strip 30. The rear member 62 is similar to rear member 8 except that the top portion 63 has a depending L-shaped rearwardly facing flange 64 from the inner edge 65 and the ledge portions or shoulders on the rear wall are omitted. The front and nosing member 65 is a generally C or channel shaped member with the bottom portion 67 similar to the wall 21, except bottom portion 67 and wall 68 are integral. In the illustrated structure the wall 68 slopes forwardly and a top wall 69 extending from the wall 68 has a depending L shaped flange 70 in opposed relation to the L shaped flange 64 of rear member 62. An anti-slip surface 71 is provided on the upper outer surface of the top wall or portion 69 by a plurality of strips of abrasive material 72 inserted into a plurality of longitudinally continuous channel shaped furrows 72. When the modified form of the invention illustrated in FIG. 4 is used in an open stair the tread end closure structure (not shown) would be substantially the same as shown in FIGS. 1 to 3, inclusive. The tread structure is filled with a suitable tread wear material 73 such as terrazzo or the like.

FIG. 5 illustrates another modified form of the stair tread structure wherein the front and nosing member 72 is an integral structure that is generally C or channel shaped having an upstanding front wall 74, top wall 75, and bottom portion 76. The front wall 74 has inwardly extending ledges 77 substantially the same as the rear member 8 of the form shown in FIGS. 1 to 3, inclusive. The remaining parts of the tread is substantially the same and assembled and connected in the manner as shown and described relative to FIGS. 1 to 3 inclusive and like portions are designated by the same reference numerals.

FIG. 6 illustrates a modified form of the stair tread structure wherein front and rear members 78 and 79 respectively are generally C or channel shaped, are of the same cross section, and are from the same extrusion but are cut and arranged in opposed relation. The front member 78 and rear member 79 each have an upstanding wall 80, a top wall 81, and a bottom wall 82. Each bottom wall 82 has a lonigtudinally continuous upstanding rib 83 substantially similar to ribs 43 and 44 of the tread structure shown in FIGS. 1 to 3 inclusive. The bottom walls 82 of the front member 78 and the rear member 79 are joined by an open top pan assembly 85. In the illustrated structure the plate 84 and the bottom walls 82 of the front and rear member 78 and 79 are joined by welding as at 86. Each upstanding wall 80 has an inwardly extending ledge 87 on which rest support bars 38. The top wall 81 of each front and rear member 78 and 79 has a groove 88 in adjacent or inner edges 89 shaped so that a weld 90 to the bars 38 will not extend beyond the edge 89. The bars 38 support a tread member 34 of the structure described relative to the form shown in FIGS. 1 to 3 inclusive. The tread member 34 is suitably held in place as by epoxy 91 or other suitable adhesive. The top walls 81 of the front and rear members 78 and 79 each have an upwardly opening channel 92. In the illustrated structure the bottom of the channel 92 has longitudinal recesses 93 at each side edge 94 and each of the edges 94 has inwardly extending ribs 96. The ribs 96 engage an insert 97 which has an anti-skid surface 98 is defined by longitudinally extending ridges 99 and longitudinally spaced transverse ridges 100. When the insert 97 is vinyl or other suitable resilient material the anti-skid surface 98 as shown is defined by longitudinally extending ridges 99 but could be any other desired shape. The resilient insert is formed in a shape complementary to the channel 92 including recesses 93, edges 94, bottom and ribs 96. The rigid insert 97 engages ribs 96 and bottom and a suitable adhesive such as epoxy 101 is placed in recesses 93. The insert 97 is removable for replacing when damaged or worn.

The stair tread structures shown in FIGS. 4, 5, or 6 are adapted to be mounted on suitable supports to form an open or closed stair structure in the same manner as the stair structure illustrated in FIGS. 1 to 3 inclusive. When the tread structures shown in FIGS. 4, 5, or 6 are used in an open type stair a suitable end closure such as the tread end closure structure 5 is used.

The forms of stair treads shown in FIGS. 4, 5, and 6 could be assembled in the factory and shipped to the location substantially in the manner described relative to the forms shown in FIGS. 1 to 3, inclusive. In each of the forms shown the baluster may vary in accordance with the desired design of the entire stair assembly including suitable handrails.

It is believed obvious that the stair tread structure and tread end closure structure including baluster or post supports of my invention provides a stair tread structure capable of being fabricated by extrusion which when assembled has suitable stiffness and strength and lightness of weight that may be used in a variety of designs and structures.

It is to be understood that while I have illustrated and described one form of my invention, it is not to be limited to the specific form or arrangement of parts herein described and shown except insofar as such limitations are included in the claims.

What I claim and desire to secure by Letters Patent is:
1. A stair tread structure comprising:
   (a) elongate relatively rigid opposed front and rear generally channel shaped members having top and bottom walls connected by respective upstanding outer walls,
   (b) an elongated bottom member coextensive with said front and rear members extending between the bottom walls thereof, said bottom member and front and rear members having engaging adjacent edge portions,
   (c) means receiving said adjacent edge portions of the bottom member and bottom walls of the front and rear members together in a hollow pan structure with said front and rear members top walls spaced apart to define a longitudinal opening therebetween,
   (d) a tread member in said hollow pan structure closing said longitudinal opening and having an upper tread surface substantially flush with top surface of the top walls of the front and rear members.

2. A stair tread structure as set forth in claim 1 wherein the elongate relatively rigid front channel shaped member comprises:
   (a) an elongate relatively rigid L-shaped front and nosing member having a top flange opposing the top wall of said channel shaped rear member and an outer wall generally parallel to said upstanding outer wall of said channel shaped rear member,
   (b) an elongated plate-like bottom member generally parallel to said top flange,
   (c) cooperative inter-engaging means on the outer wall of the front member and a forward edge portion of the bottom member securing same together in said generally channel shape.

3. A channel shaped member as set forth in claim 2 wherein the cooperative inter-engaging means consists of:
   (a) a longitudinally extending bottom opening channel in said outer wall of the front member, said channel having longitudinally extending side ridges on interior walls of said channel,
   (b) the bottom plate-like member having an upright flange on the forward edge having complementary ridges to those of said channel.

4. A stair tread structure as set forth in claim 1 wherein the tread member comprises:
   (a) a longitudinally extending pan member with upturned opposed edges,
   (b) tread material filling said pan members,
   (c) and means extending transversely of the longitudinal opening between the front and rear members for supporting said pan member in opening.

5. A stair tread structure as set forth in claim 1 wherein the means securing said adjacent edge portions of the bottom members and bottom walls of the front and rear member includes:
   (a) longitudinally extending grooves on the adjacent edge portions of the bottom walls of the front and rear members,
   (b) L-shaped flanges on opposed edges of the bottom member interlocking in said grooves,
   (c) L-shaped flanges on opposed edges of the bottom walls of said front and rear members interlocking with and in an overlying relation to said L-shaped flanges of said bottom member.

6. A stair tread structure as set forth in claim 1 wherein the top wall of the front member has longitudinal ridges with transverse grooves defining an anti-skid surface.

7. A stair tread structure as set forth in claim 1 including:
   (a) a tread end closure,
   (b) and means securing said end closure to the front and rear members of the tread structure.

8. A stair tread structure as set forth in claim 7 wherein the tread end closure includes:
   (a) a relatively rigid center spacer member,
   (b) relatively rigid front and rear extensions, mounted on said center spacer member and cooperating therewith to form an end closure fitting the end of said tread structure,
   (c) a baluster support socket in said tread end closure,
   (d) the socket is vertically arranged, (e) an elongate sleeve member having an exterior surface complementary to said socket is mounted therein,
(f) an elongate baluster is mounted in said sleeve,
(g) and means securing said baluster, sleeve, and center spacer member together.

9. A stair tread structure as set forth in claim 7 wherein the means securing the end closure to the tread structure includes a plurality of vertical L shaped ribs on the tread closure, said ribs being spaced and of a height to extend into the tread structure between the top wall and the bottom wall respectively of the front and rear members and engage same, said ribs engaging the upstanding outer wall of said front and rear members respectively to position the end closure relative thereto.

10. A tread structure as set forth in claim 1 wherein:
(a) the top wall of one of the front and rear members has a longitudinally extending upwardly opening channel,
(b) an elongate insert received in said channel, said insert having a non-skid upper surface.
(c) means receiving said insert in said channel.

References Cited
UNITED STATES PATENTS

| | | | |
|---|---|---|---|
| 145,209 | 12/1873 | Hyatt | 52—182 |
| 559,081 | 4/1896 | Kandeler | 52—182 |
| 1,092,572 | 4/1914 | Hartmann | 52—182 |
| 553,487 | 1/1896 | Godfrey | 182—228 |
| 442,256 | 12/1890 | Nash | 52—182 |
| 1,056,607 | 3/1913 | Verity et al. | 52—182 |

REINALDO P. MACHADO, *Primary Examiner.*